SYNCHRONOUS DRIVE ARRANGEMENT FOR RECORD CARRIERS

Filed June 15, 1967

INVENTORS
Milan Meninger, Miloš Bláha

By Richard Low
Ag't

United States Patent Office 3,498,702
Patented Mar. 3, 1970

3,498,702

SYNCHRONOUS DRIVE ARRANGEMENT FOR RECORD CARRIERS

Milan Meninger, Prague, and Miloš Bláha, Mnichovo Hradiste, Czechoslovakia, assignors to Vyzkumny ustav rozhlasu a televise, Prague, Czechoslovakia Filed June 15, 1967, Ser. No. 646,332
Claims priority, application Czechoslovakia, June 29, 1966, 4,352/66
Int. Cl. G03b *31/00, 31/04*
U.S. Cl. 352—12 5 Claims

ABSTRACT OF THE DISCLOSURE

Alternating reflecting and non-reflecting portions of moving magnetic sound tape intermittently reflect the light of a constant light source to a photoelectric cell. The resulting electric pulses are amplified and used for synchronously driving a motion picture film.

BACKGROUND OF THE INVENTION

This invention relates to a synchronous drive arrangement for a plurality of record carriers, and particularly to the synchronization of the sound and picture in sound films.

It is common practice to reproduce the sound and the picture for sound film from separate carriers which are perforated and mechanically synchronized. When the sound is initially recorded on imperforate magnetic tape, as is usual, synchronizing pulses are generated by the camera and recorded on the tape as pilot signals. A perforated sound carrier is then prepared from the imperforate tape.

It has not been possible heretofore to synchronize an imperforate sound record with the photographic film at all speeds, particular difficulties being encountered during starting and stopping.

The magnetically recorded pilot signals can keep the two record carriers synchronous only at or near the rated full speed. It has therefore been necessary to transcribe the sound record to a perforated carrier.

It is an object of this invention to synchronize a magnetic sound record with a picture record at all speeds, that is, also during starting and stopping whether the record carriers are perforated or imperforate.

SUMMARY OF THE INVENTION

According to this invention, a moving, elongated, controlling record carrier is provided with longitudinally spaced, light-reflecting indicia which are illuminated by a stationary, constant light source. The sequence of light pulses of the reflected interrupted beam is picked up by a photoelectric cell and converted to a sequence of electric pulses which are amplified and fed to the electrical drive unit of the controlled carrier for moving the same.

The spacing of the indicia on the sound carrier may correspond to the length of one frame on the picture carrier. This arrangement is effective at all speeds from zero to maximum speed and in both directions of movement. Any number of perforated or imperforate carriers may be synchronized.

If the controlled carrier is also imperforate, it is provided with synchronizing indicia as described above, and the electric signals are fed to a discriminator for adjusting the speed of the controlled carrier.

DESCRIPTION OF PREFERRED EMBODIMENTS

Figure 1:
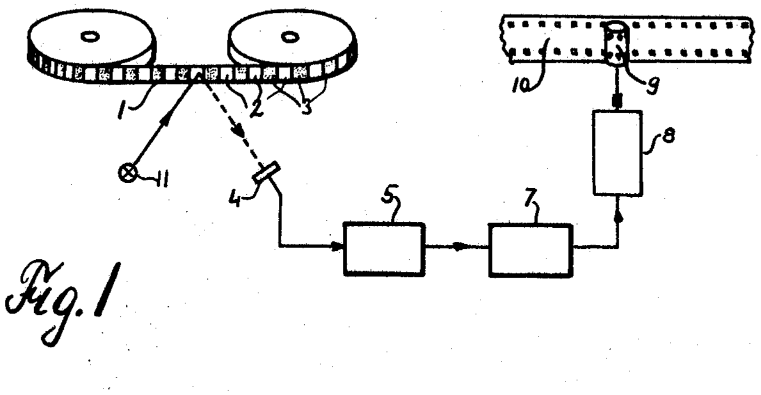
FIG. 1 diagrammatically illustrates an arrangement for synchronously driving a perforated record carrier in response to indicia on an imperforate carrier.

FIG. 1 shows a magnetic tape 1 which is being moved between reels 20, 21. Reflecting surfaces 2 longitudinally alternate with light absorbing surfaces 3 on the imperforate tape 1. The tape 1 is illuminated by a constant light source 11, and the interrupted beam reflected by the moving tape is picked up by a photoelectric cell 4. The resulting electric output pulses of the cell 4 are amplified in an amplifier 5, and fed by a pulse transformer 7 to a stepping drive unit 8 conventional in the motion picture art for energizing the same. The drive unit 8 drives a toothed roller 9 which engages perforations on motion picture film 10.

Figure 2:
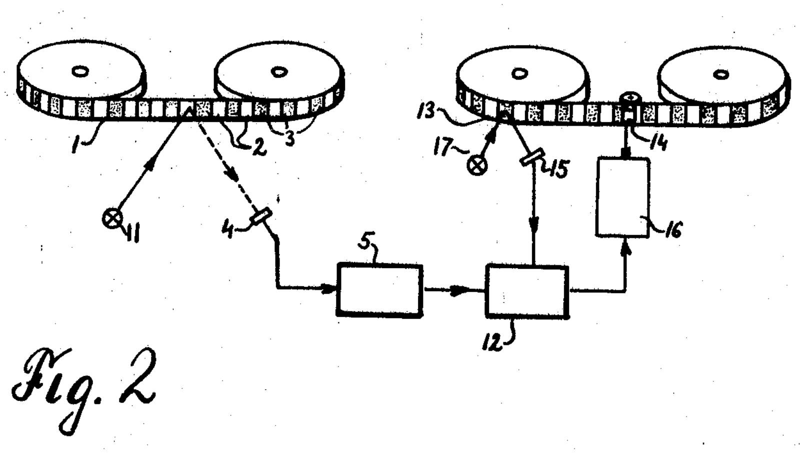
FIG. 2 similarly shows an arrangement wherein both the controlling and the controlled carrier are imperforate.

FIG. 2 shows an arrangement partly identical with that described with reference to FIG. 1, but adapted for an imperforate controlled carrier. The signal derived from the controlling tape 1 and amplified in the amplifier 5 is fed to a discriminator 12. The second input signal for the discriminator is derived from the imperforate controlled carrier 13 which is a moving band provided with alternating reflecting surfaces 2 and light absorbing surfaces 3 and is illuminated by a constant light source 17. The interrupted beam reflected from the moving band 13 is converted to a sequence of electric pulses by a photoelectric device 15, and the pulses are fed to the second input terminal of the discriminator 12.

The output signal of the discriminator corresponds to the difference in pulse frequency in the two input signals and is fed as a corrective signal to a motor 16 which drives the record carrier 13 by means of a roller 14.

Suitable discriminator arrangements have been described in a paper entitled "Low Frequency Discriminator" in Electronics, June 1949, page 460; in a paper entitled "Linear Frequency Discriminator" in Electronic Technology, November 1961, and in a paper entitled "Dispositif de Synchronisation par Comptage" in the magazine published by the Office de Radiodiffusion et Television de France, Service des Etudes, January 1967.

As compared to known synchronization arrangements, the apparatus of the invention is free from the audible distortion unavoidable if the camera speed is non-uniform in the afore-described conventional pilot signal method.

Other advantages of this invention are the absence of a pilot signal and the superior flexibility of the imperforate magnetic tape as compared to perforated magnetic carriers, and account for improved tone quality. The imperforate magnetic recording material is also substantially less costly than perforated magnetic tape.

The synchronizing system of the invention can be used not only for synchronizing sound and picture, but also for the automatic control of several tape recorders for broadcast transmission and the like.

What is claimed is:

1. In a synchronous drive arrangement for two record carriers:

(a) a first elongated record carrier;

(b) a plurality of light-reflecting indicia uniformly spaced in the direction of elongation on said first carrier;

(c) moving means for longitudinally moving said first carrier;

(d) a constant light source for illuminating said carrier and the indicia thereon, a sequence of light pulses being reflected from said indicia when said carrier is moved by said moving means;

(e) pick-up means arranged to receive said pulses and to emit a sequence of electric pulses in response to the light pulses received;

(f) a second elongated record carrier;

(g) drive means for longitudinally moving said second carrier; and (h) electric circuit means connecting said pick-up means with said drive means for controlling the speed at which said second carrier is moved by said drive means in response to the frequency of said electric pulses.

2. In an arrangement as set forth in claim 1, said first carrier being imperforate magnetic sound-recording tape.

3. In an arrangement as set forth in claim 1, said second record carrier being provided with a longitudinal row of perforations; said drive means including a toothed roller engaging said perforations, and a drive unit rotating said roller; and said circuit means including an amplifier for amplifying said electric pulses, and means for transmitting the amplified pulses to said unit for energizing the same.

4. In an arrangement as set forth in claim 3, said first carrier being imperforate magnetic sound-recording tape, a pulse transformer conductively interposed between said amplifier and said drive unit, said drive unit including a stepping drive, the driving speed of said stepping drive being controlled by said corrective signal.

5. In an arrangement as set forth in claim 1, said second carrier being provided with a plurality of additional light reflecting indicia uniformly spaced in the direction of elongation of said second carrier; and additional light source positioned for illuminating said second carrier and the indicia thereon, a sequence of additional light pulses being reflected from the indicia on said second carrier when the latter is moved by said drive means; additional pick-up means arranged to receive said additional light pulses and for emitting a sequence of additional electric pulses in response to the light pulses received; said circuit means including discriminator means in circuit with the pick-up means associated with said first and second carriers for receiving the respective sequences of electric pulses and to emit a correction signal in response to a difference in the frequencies of said sequences, the circuit means further including means for feeding said correction signal to said drive means.

References Cited

UNITED STATES PATENTS

| | | | |
|---|---|---|---|
| 1,910,995 | 5/1933 | Leventhal | 352—180 |
| 2,132,003 | 10/1938 | Holst | 352—17 |
| 2,378,611 | 6/1945 | Westerkamp | 352—17 |
| 2,679,187 | 5/1954 | Bitting | 352—17 |
| 2,976,765 | 3/1961 | Banno | 352—20 |

NORTON ANSHER, Primary Examiner

DAVID S. STALLARD, Assistant Examiner

U.S. Cl. X.R.

352—24, 31, 37, 236